United States Patent
Lunt et al.

(10) Patent No.: US 7,142,573 B2
(45) Date of Patent: Nov. 28, 2006

(54) ETALON CAVITY WITH FILLER LAYER FOR THERMAL TUNING

(75) Inventors: David Lunt, Tucson, AZ (US); Yakov Sidorin, Tucson, AZ (US)

(73) Assignee: Coronado Technology Group, LLC, Tucson, AZ (US)

( * ) Notice: Subject to any disclaimer, the term of this patent is extended or adjusted under 35 U.S.C. 154(b) by 282 days.

(21) Appl. No.: 10/841,131

(22) Filed: May 7, 2004

(65) Prior Publication Data

US 2005/0094699 A1    May 5, 2005

Related U.S. Application Data

(60) Provisional application No. 60/512,050, filed on Oct. 17, 2003.

(51) Int. Cl.
*H01S 3/04* (2006.01)
(52) U.S. Cl. .............................. 372/34; 372/57; 372/92; 372/98; 372/108
(58) Field of Classification Search ................. 372/19, 372/34, 92, 98, 57, 108; 356/352
See application file for complete search history.

(56) References Cited

U.S. PATENT DOCUMENTS

| 4,782,492 A | * | 11/1988 | McMahon et al. ............ 372/34 |
| 6,181,726 B1 | | 1/2001 | Lunt |
| 6,215,802 B1 | * | 4/2001 | Lunt ............................ 372/34 |
| 2003/0012250 A1 | * | 1/2003 | Shirasaki ....................... 372/98 |
| 2003/0210727 A1 | * | 11/2003 | Frisken et al. ................. 372/92 |

* cited by examiner

*Primary Examiner*—Tuyet Vo
*Assistant Examiner*—Leith A. Al-Nazer
(74) *Attorney, Agent, or Firm*—Quarles & Brady Streich Lang LLP; Antonio R. Durando

(57) ABSTRACT

A temperature-stable and temperature-tunable composite etalon with an increased field of view is constructed by partially filling the cavity with a transmissive parallel-plate filler. The coefficient of thermal expansion and the index of refraction of the filler material are selected so as to produce the desired rate of change of the optical length of the cavity as a function of temperature. The filler plate is preferably chosen to be significantly thicker than the remaining air gap in the etalon cavity. As a result, the fact that the filler plate occupies a large part of the cavity space increases the acceptance angle of the etalon of the invention in comparison with corresponding conventional air-spaced etalons.

18 Claims, 9 Drawing Sheets

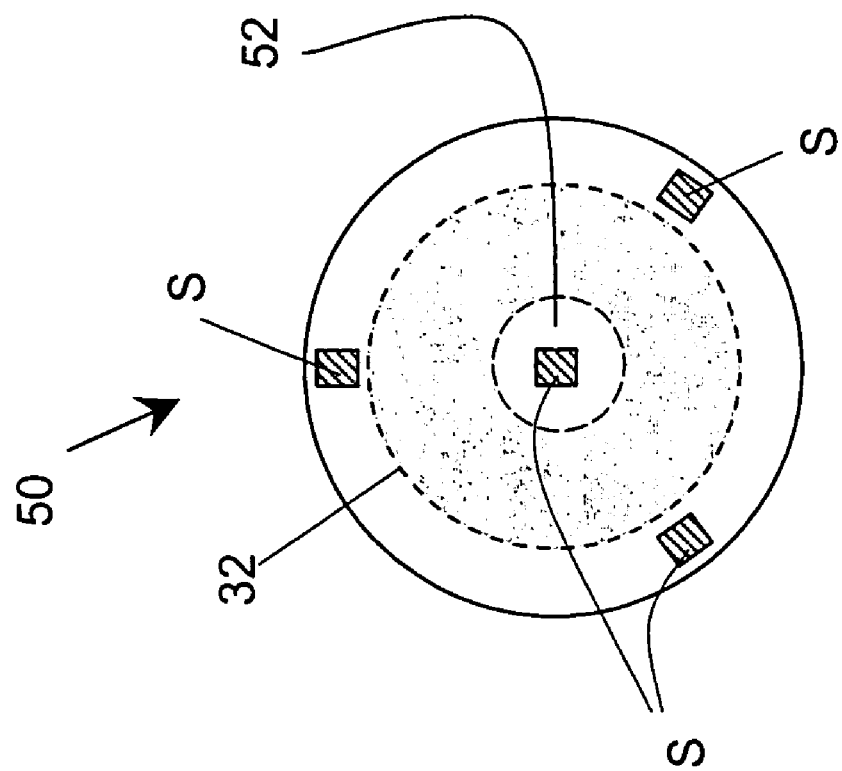
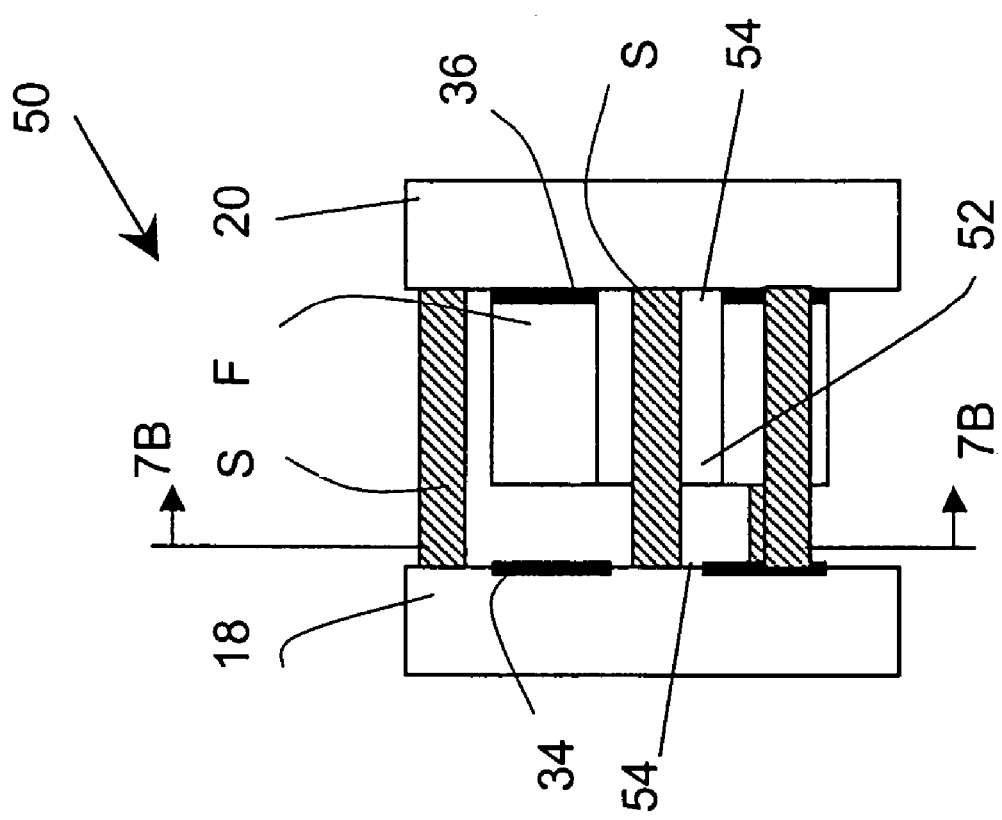

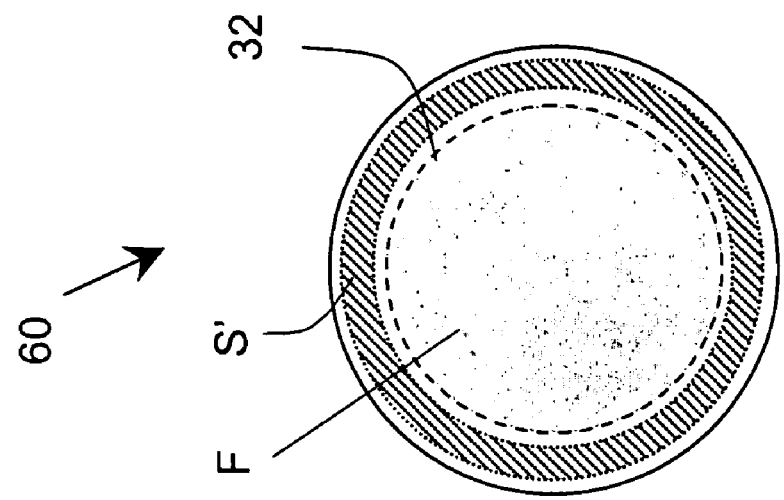
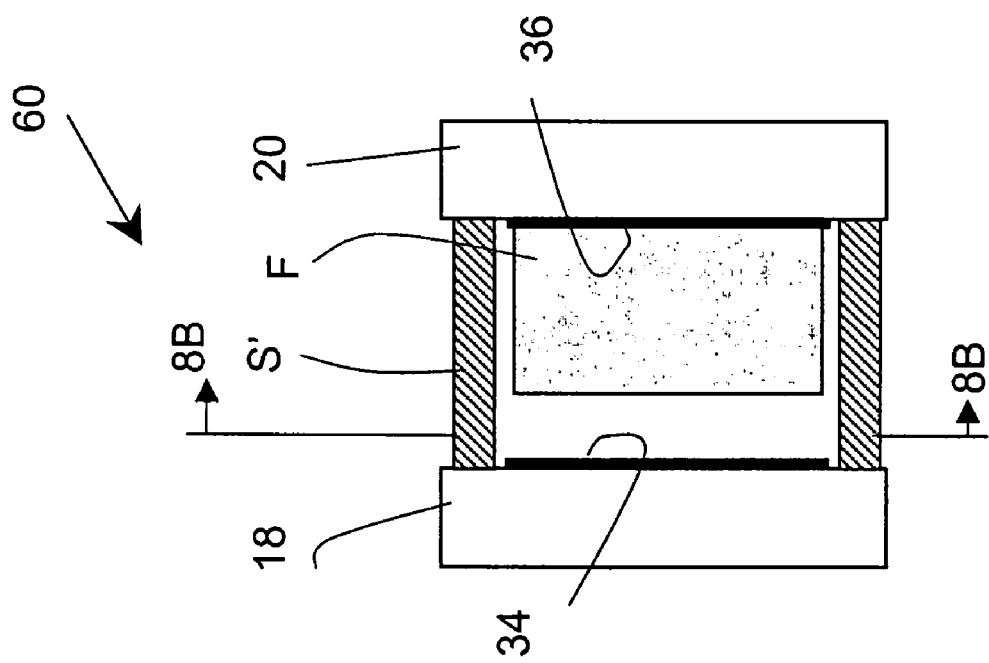
Fig. 8A
Fig. 8B

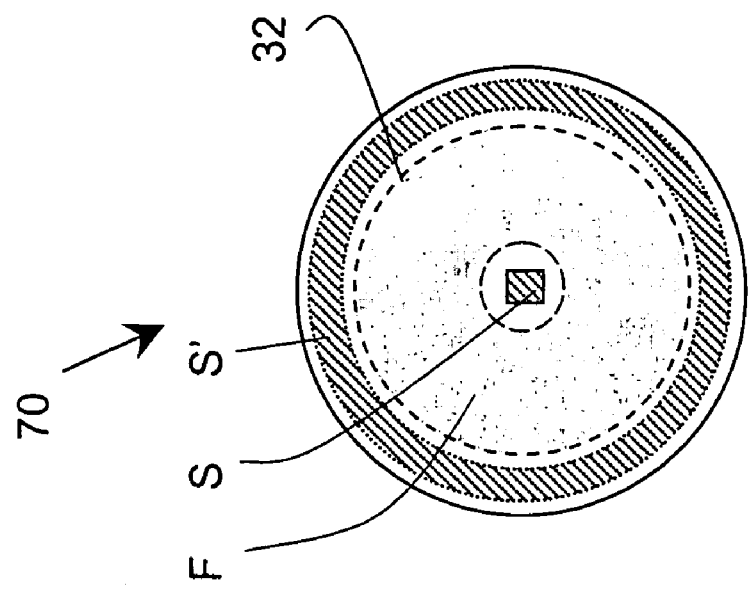
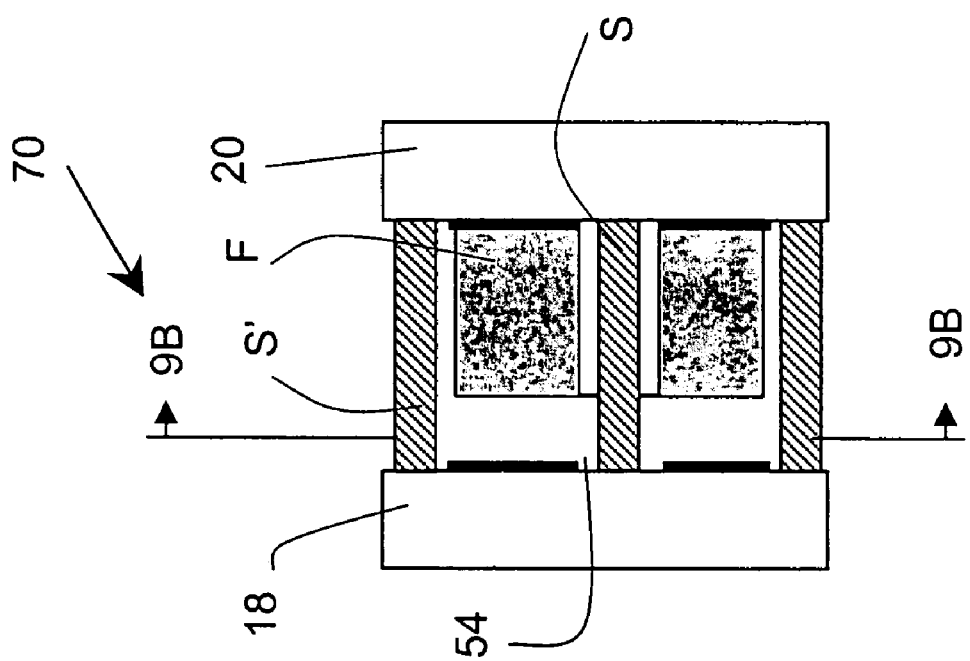
Fig. 9B
Fig. 9A

ETALON CAVITY WITH FILLER LAYER FOR THERMAL TUNING

RELATED APPLICATIONS

This application is based on U.S. Provisional Ser. No. 60/512,050, filed Oct. 17, 2003.

BACKGROUND OF THE INVENTION

1. Field of the Invention

This invention pertains to the general field of optical filters and, in particular, to temperature-stable and tunable high-performance etalon filters.

2. Description of the Prior Art

Etalons are well known optical devices that consist of two reflective surfaces parallel to one another and spaced apart by solid spacers to produce a predetermined optical length (the "cavity length"). They may consists simply of a solid parallel plate with reflective surfaces (so called "solid etalons") or of two plates with an air gap between them that defines the cavity (so called "air-spaced etalons"), as illustrated in FIG. 1. A hybrid form of etalon (so called "re-entrant etalon") utilizes an additional solid structure with a reflective surface (a "riser") between the two plates in order to achieve narrower cavity lengths than practically obtainable with the use of spacers.

When illuminated with a broadband collimated light, etalons produce a transmission beam and a reflection beam with periodic spectra characterized by very narrowband spikes centered at wavelength determined by the physical properties and dimensions of the etalon. A typical etalon transmission spectrum is illustrated in FIG. 2. With reference to air-spaced etalons, in particular, the specific center wavelength $\lambda'$ of the passband (the spectral spike) and the period between spectral spikes (commonly referred to in the art as channel spacing or free spectral range—FSR—of the device) are a function of the optical length of the etalon's cavity. This disclosure is limited to a discussion of transmission operation because those skilled in the art would readily understand that it is similarly applicable to reflection operation.

In particular, referring for example to the etalon 10 and the intensity spectrum 12 of FIGS. 1 and 2, respectively, minor changes in the optical length L (corresponding to the geometric length L' shown in the figures) of the cavity 14 will cause a shift of the periodic spectrum along the wavelength axis, as indicated by arrows 16. As is well understood by those skilled in the art, varying the optical length L of the cavity also produces a change in the width of the spectral spike and in the free spectral range of the etalon.

These properties of etalons are very advantageous for many optical applications. In particular, etalons are used as high-performance filters to isolate light of a very a precise frequency, as may be needed for a particular application. In telescopic astronomy, for instance, such filters are particularly useful for observing objects at specific wavelengths. Since the exact wavelength of each peak is a function of the exact optical length L of the cavity, it has been most important in the art to build etalon filters with precise and uniform spacing between the two plates (18,20) constituting the etalon (FIG. 1). To that end, very precisely machined spacers 22,24 of equal thickness L' are used, typically uniformly distributed around the annular periphery of the plates in a sufficient number to separate the plates and produce a cavity of uniform optical length L. Moreover, these spacers are typically made of materials having a low coefficient of thermal expansion. (It is noted that L' is the physical cavity length corresponding to the desired optical path length L, the two quantities being related by the equation L=nL', where n is the index of refraction of the medium in the cavity.).

In practice it has been difficult and expensive to achieve the desired degree of perfection because of the very narrow tolerances (in the order of nanometers) required for the level of performance associated with extremely narrowband applications. U.S. Pat. Nos. 6,181,726 and 6,215,802 disclosed several advances over the prior art whereby the uniformity of the etalon's optical length was improved. According to one approach described in the patents, all the spacers used to form the etalon are selected from a common local area of a spacer substrate produced by standard-precision optical manufacturing techniques. It was discovered that, as a result of this selection, the spacers tend to have substantially more uniform thickness and, therefore, they produce a more uniform etalon cavity. According to another, complementary approach, an additional spacer from the same local substrate area is used at the center of the etalon, thereby providing a correction to plane deformations produced by the optical contact of the peripheral spacers with the etalon plates.

While the techniques described in these patents provide a significant improvement over the etalons previously known in the art, they are very labor-intensive and therefore expensive to practice. In addition, the resulting etalons, while more uniform in the optical length of the cavity, are not necessarily tuned to the precise desired wavelength. Copending U.S. Ser. No. 10/795,167 discloses a solution to this problem based on the use of counterbalanced forces applied to the etalon elements. This approach constitutes another significant advance in the art, but it does not address the problem of changes in performance (in terms of center wavelength and FSR) produced by thermal variations. Therefore, there is still a need for an etalon structure that is relatively insensitive to thermal effects and that produces extremely accurate tuning of the optical length of the etalon cavity. The present invention provides a solution to this remaining challenge that also produces a greater range of angular acceptance and a mechanism for thermally tuning the etalon to a precise level of performance.

BRIEF SUMMARY OF THE INVENTION

This invention relates to a temperature-stable and temperature-tunable composite etalon constructed by partially filling the cavity of an air-spaced etalon with a solid parallel-plate filler. The etalon plates are spaced apart in conventional manner using a plurality of spacers and the resulting air gap is partially filled with an optically transmissive material (hereinafter referred to as a "filler plate") having a predetermined thermal coefficient of expansion in relation to that of the spacers, thereby producing an etalon referred to as a "composite solid-air-spaced etalon." The filler plate is optically contacted to one of the etalon mirror coatings inside the cavity and replaces part of the air gap. According to one aspect of the invention, the filler plate's coefficient of expansion is chosen opposite in sign to that of the material of the spacers and this parameter, in conjunction with the thickness of the filler plate, may be judiciously selected so as to provide a thermally stable etalon within a substantial range of temperature operation.

According to another aspect of the invention, because the thermal behavior of the composite etalon is predictable and quantifiable on the basis of the thermal characteristics of the filler material, the filler plate may alternatively be used to thermally tune the etalon to a precise desired spectral performance. Since it is known that a temperature change causes a related change in the optical length of the cavity (and correspondingly a shift in the passband center wavelength), the presence of the filler plate can be advantageously utilized to affect the thermal dependence of the optical cavity length. That is, the coefficient of thermal expansion and the index of refraction of the filler material are selected so as to produce the desired rate of change of the optical length of the cavity as a function of temperature. Thus, the index of refraction and the thickness of the filler-plate can be used to manipulate the thermal response of the etalon, either increasing or decreasing the thermal response of a corresponding air-spaced etalon, as desirable for a particular application. In essence, these parameters provide two additional degrees of freedom over the prior-art parameters utilized in the design of etalons.

According to yet another aspect of the invention, the filler plate is preferably chosen to be significantly thicker than the remaining air gap in the etalon cavity. As a result of this configuration, while the presence of the air gap permits spectral tunability of the etalon (both by prior-art mechanical means and by thermal means, as disclosed herein), the fact that the filler plate occupies a large part of the cavity space increases the field of view of the etalon of the invention in comparison with corresponding conventional air-spaced etalons.

Thus, the invention provides a composite etalon filter capable of operating at a single wavelength or at a plurality of wavelengths, with several advantageous characteristics produced simultaneously by its novel aspects. First, the spectral performance of the filter can be thermally tuned over a wider range than achievable with conventional etalons; second, the angular acceptance of light by the filter (within the tolerances of the desired optical performance) is increased as compared to that of conventional air-spaced etalons; finally, the filler-plate material and its thickness can be selected to produce substantial thermal stability within a predetermined range of temperature operation.

Various other aspects and advantages of the invention will become clear from the description in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the various ways in which the invention may be practiced.

BRIEF DESCRIPTION OF THE DRAWINGS

FIG. 7A is a schematic representation in side view of another etalon according to the invention including an additional central foot spacer and wherein the etalon is partially rotated around its longitudinal axis to visibly display the peripheral spacers.

FIG. 7B is a cross-section of the etalon of FIG. 7A as seen from the plane defined by lines 7B in FIG. 7A.

FIG. 8A is a schematic representation in side view of another etalon according to the invention including a tubular ring spacer instead of peripheral spacers.

FIG. 8B is a cross-section of the etalon of FIG. 8A as seen from the plane defined by lines 8B in FIG. 8A.

FIG. 9A is a schematic representation in side view of another etalon according to the invention including a central foot spacer in addition to the ring spacer of FIGS. 8A/B.

FIG. 9B is a cross-section of the etalon of FIG. 9A as seen from the plane defined by lines 9B in FIG. 9A.

DETAILED DESCRIPTION OF THE INVENTION

This invention is based on the general idea of introducing a transmissive filler material in the cavity of a conventional air-spaced etalon with thermal and optical characteristics designed to produce a predictable thermal behavior within a range of performance of interest for a particular application. These parameters may be used to produce a thermally tunable or a thermally stable etalon filter. In either case, the field of view of the filter is greatly increased by the presence of the filler plate within the etalon structure.

For the purposes of this disclosure, "angle of acceptance" and "field of view" of an etalon filter are defined, as commonly accepted in the art, as the maximum angle of incidence within which the spectral characteristics of the etalon remain within predetermined acceptable boundaries. The term "spacer" refers to any structural component that creates a separation between the optical surfaces of an etalon, whether or not the spacer is integral with another structure and whether or not it consists of a mechanism or a body of material. "Optical surface" refers to either of the two reflective surfaces constituting the etalon of the invention. For the purposes of claiming this invention, the term "medium," used to describe the fluid of solid material between the optical surfaces of an optical cavity, is also intended to include vacuum. Finally, "thermal stability" of an optical cavity is defined as a condition whereby a negligible change in the optical cavity length is observed within a range of operating temperatures. Typical air-spaced etalons with spacers made of CLEARCERAM-HS and a cavity length of 400 microns exhibit a variation in center wavelength of about 0.5 percent of channel spacing per degree centigrade. Comparable solid etalons exhibit a greater temperature instability. Therefore, for the purposes of this disclosure any change in the length of an etalon cavity smaller than about 0.5 percent of channel spacing per degree C is considered "negligible."

Figure 1:
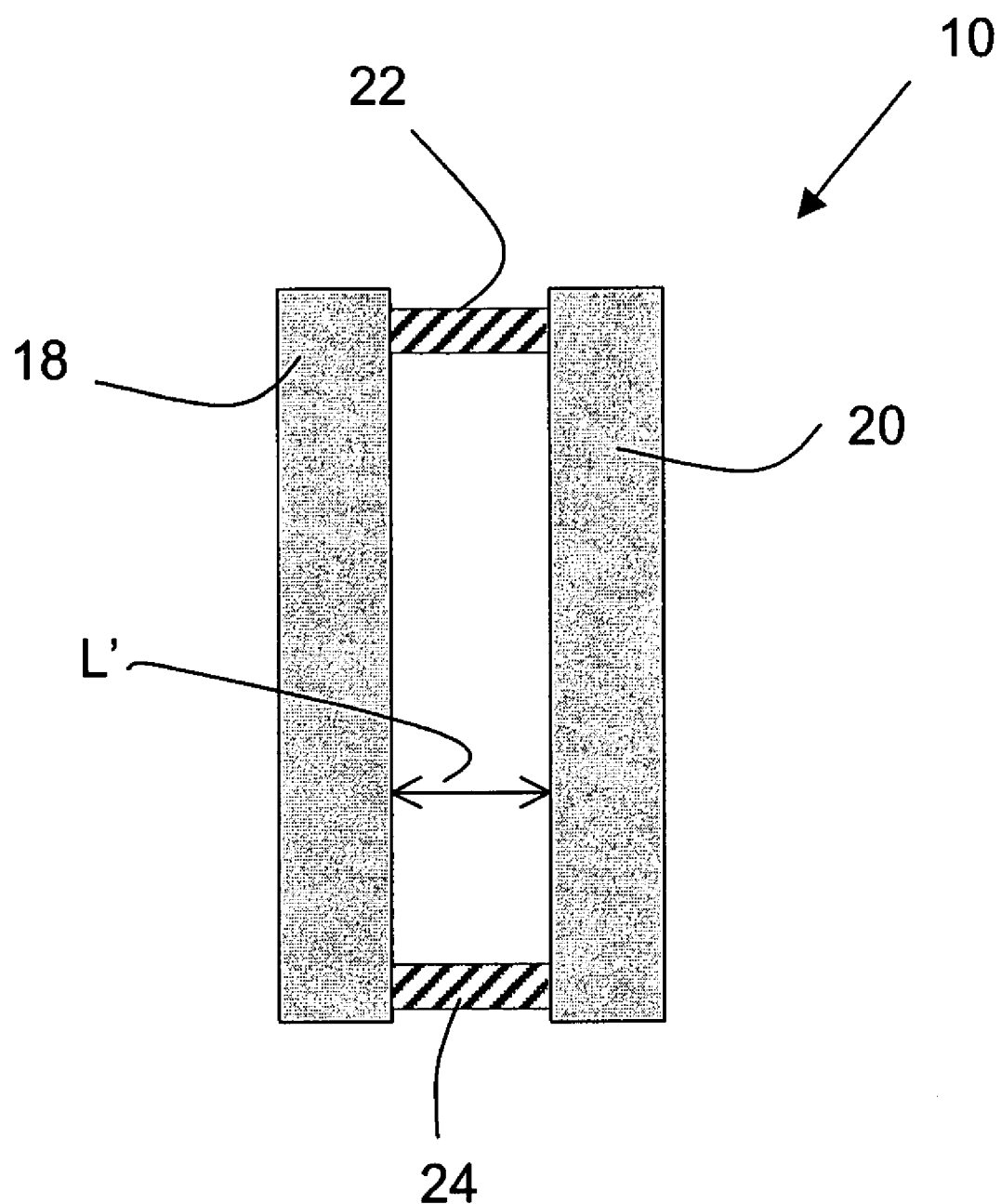
FIG. 1 illustrates schematically a conventional air-spaced etalon.
Figure 2:
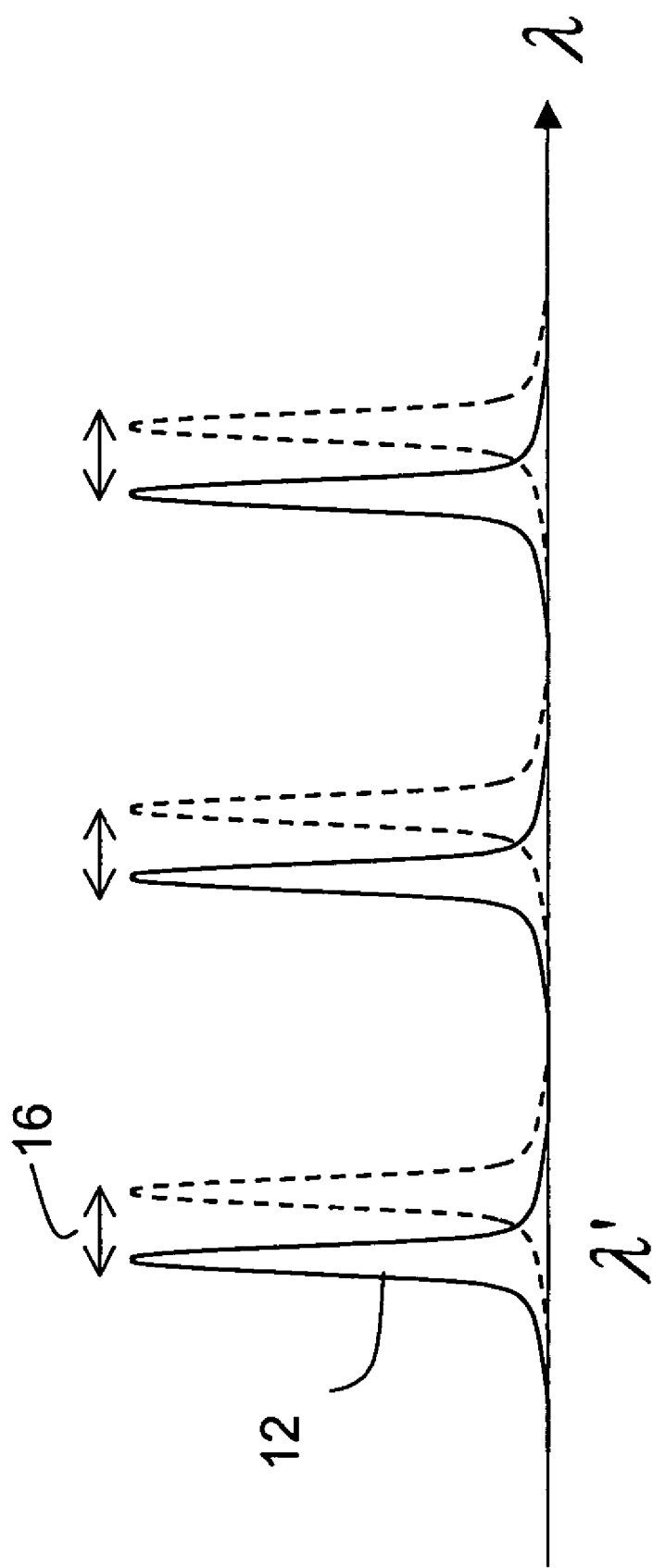
FIG. 2 is an illustration of a typical intensity-versus-wavelength spectrum of the transmission beam produced by an etalon.
Figure 3:
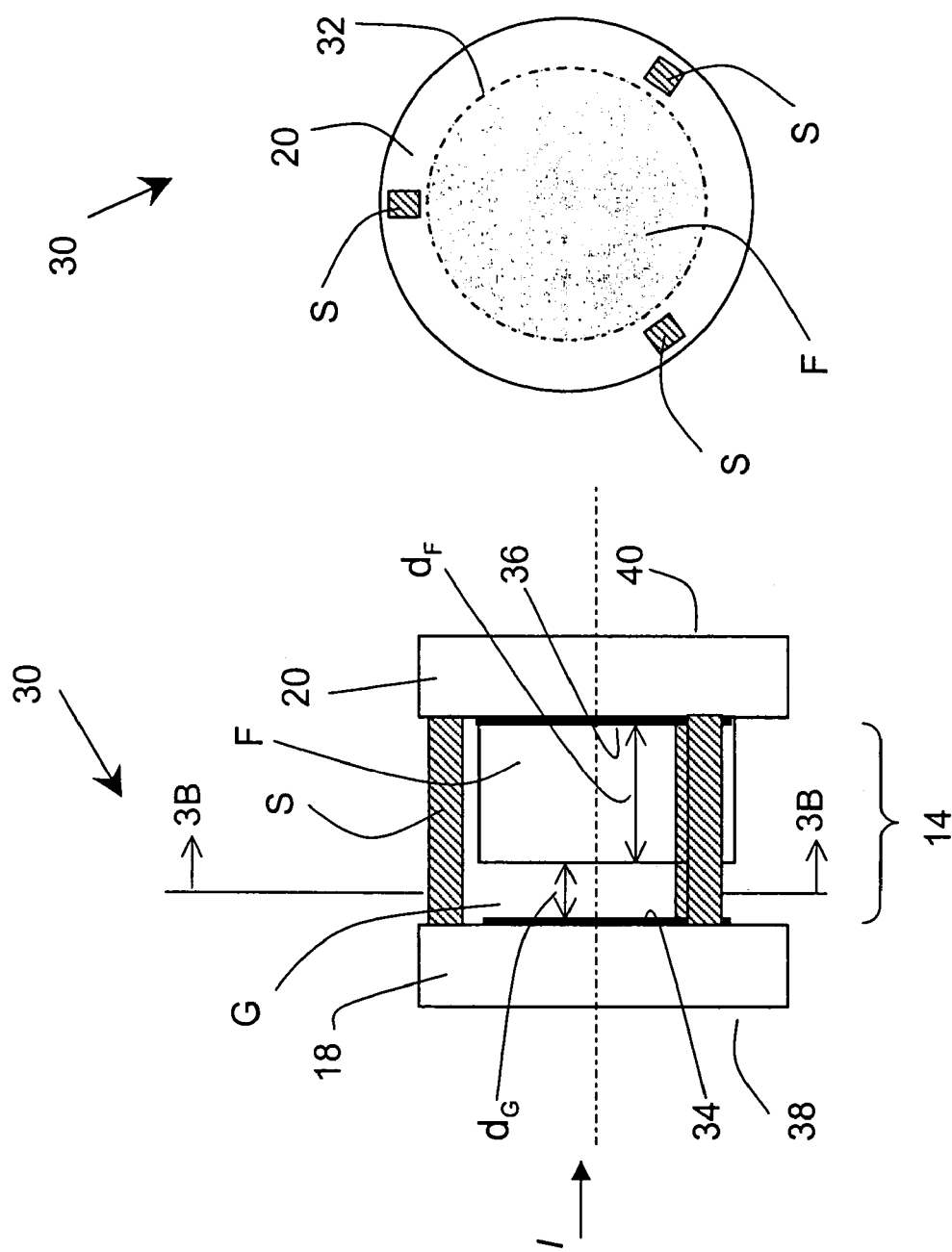
FIG. 3A is a schematic representation of an etalon according to the invention shown in a side view wherein the etalon is partially rotated around its longitudinal axis to visibly display all spacers.
FIG. 3B is a cross-section of the etalon of FIG. 3A as seen from the plane defined by lines 3B in FIG. 3A.

Referring to the figures, wherein like parts are designated with the same reference numerals and symbols, FIGS. 3A and 3B illustrate an embodiment of an etalon 30 according to the invention in side and sectioned views, respectively. The etalon 30 features two optical plates 18 and 20 optically contacted to and separated by at least one spacer or a plurality of spacers S (three are illustrated in these figures). Plates 18,20 are usually about several centimeters in diameter, but can be constructed in various dimensions depending on the application. The thickness of the etalon plates may vary, but a preferred thickness is about ⅙ of the plate diameter. Each of the etalon plates has a central clear aperture 32 for transmitting light. The etalon's cavity 14 is defined by high-reflectance coatings 34 and 36 placed on the interior surfaces of the etalon plates 18 and 20, respectively. The exterior surfaces 38,40 of the plates 18,20 may optionally also be coated in the area of the clear aperture 32 with a thin-film coating to enhance optical performance. According to the invention, an additional optical element, the transmissive filler plate F, is optically contacted to the high-reflectance coating 36 of the etalon plate 20, thereby leaving an air gap G separating the filler plate from the reflective surface 34 of the front plate 18. Because the etalon's cavity is defined by the high-reflectance coatings 34 and 36, the optical length of the cavity is defined by the sum of the optical thicknesses $d_F$ and $d_G$ of the filler plate F and the air gap G, respectively. In the preferred embodiment of the etalon filter, the air gap is elected to be thinner than the filler plate.

According to one aspect of the invention, the materials and the thicknesses of the spacers and the filler plate are appropriately chosen such that the rate of change of the optical length of the etalon cavity due to the change of the spacers' thickness with temperature is either increased or decreased by the combined effect of the corresponding changes in the refractive index and thickness of the filler plate with temperature. If the rate is increased to an operationally significant level, temperature changes can be used to tune the etalon in an efficient and predictable manner. During temperature tuning, the thickness of the air gap $d_G$ varies as the difference between the respective thicknesses of the spacers ($d_S$) and the filler plate ($d_F$). In addition, the optical length is affected by thermal changes in the refractive index of the filler-plate material, as well, all of which provide control parameters that can be used advantageously to design an etalon filter with an optical length that is thermally variable according to a predetermined response. Accordingly, this feature allows the composite solid-air-spaced etalon 30 of the invention to be precisely tuned spectrally by controlling ambient temperature.

According to another, alternative, aspect of the invention, if the thermal rate of change of the optical length of the cavity is decreased to a negligible level, a temperature stable etalon filter is produced. Still with reference to FIG. 3A, the etalon filter of the invention operates as follows. Incident light I, propagating through the filter along the etalon's main axis z at reference temperature T, traverses the optical length L of the cavity, which is defined by the following equation:

$$L = (d_S - d_F - d_C) \cdot n_G + d_F \cdot n_F, \qquad (1)$$

where $d_S$, $d_F$, $d_C$ are the thicknesses of the spacers S, the filler plate F, and the optical coatings 34,36, respectively; and $n_S$, $n_F$, $n_G$ are the refractive indices of the spacers, the filler plate, and the air gap G, respectively.

Taking the partial derivative of Equation 1 with respect to temperature and recognizing the relatively very small change of $n_G$ with temperature, the following approximate equation is derived:

$$\frac{\partial L}{\partial T} \approx d_S n_G \alpha_S + d_F \left[ (n_F - n_G)\alpha_F + \frac{\partial n_F}{\partial T} \right] \qquad (2)$$

wherein $\alpha_S, \alpha_F$ are the coefficients of thermal expansion of the spacers and the filler plate, respectively; and $\partial n_F/\partial T$ is the coefficient of the filler plate's refractive index change with temperature. From Equation 2, it is apparent that the material used to construct the filler plate F can be judiciously selected to increase or decrease the rate at which the optical cavity length L varies with temperature within a predetermined operating range, thereby providing a practical tuning mechanism or a means for achieving a thermally stable etalon. Furthermore, the filler plate's thickness $d_F$ also provides a parameter that can be used to either increase or decrease the rate at which the optical length of the etalon varies with temperature. For example, an etalon (for DWDM application, 1550 nm wavelength, 0.8 nm channel spacing) constructed in a 400-micron physical cavity length, with CLEARCERAM-HS spacers and a filler plate made of fused silica, was tunable at a rate that was less than 0.5% of the channel spacing per degree C for filling ratios up to 0.35.

As is well known in the art, when operating in converging light, the optical performance of an etalon (such as peak wavelength, transmission bandwidth, and peak transmission) changes as a function of the angle of convergence (see, for example, H. A. Macleod, *Thin Film Optical Filters*, IOP Pub., 3$^{rd}$ ed., 2001). It is also well known that solid-spaced etalon filters accept light within a wider angle of convergence than air-spaced etalons while maintaining optical performance within a predetermined tolerance window. Comparing two etalons 1 and 2, their fields of view (equal to twice their corresponding acceptance semi-angles $\theta_1$ and $\theta_2$, respectively) with analogous optical performance within the same tolerance window are proportional to the effective refractive indices $n_1$ and $n_2$ of the cavities comprising the respective etalons. Indeed, it can be shown that, when the etalon cavity is uniformly filled with several optical materials geometrically contained within plane surfaces that are parallel to the surfaces of the etalon plates, the overall effective refractive index of the cavity gap (hereinafter referred to as the "effective cavity index") can be modeled as a weighted sum of the refractive indices involved, where the weight coefficients are taken in proportion to the length of the cavity occupied by materials in question. Accordingly, the effective index $n_{eff}$ of a cavity that is composed of i layers of materials with indices $n_i$ and thicknesses $l_i$ is calculated as $$n_{eff} = \sum_i \frac{l_i}{L'} n_i \qquad (3)$$

where L' is the overall geometrical length of the etalon cavity. Therefore, partial filling the etalon gap with a filler-plate material that is optically denser than air produces an increased angle of acceptance with respect to a corresponding conventional air-spaced etalon. It can also be shown that a larger filling ratio, defined for the purposes of this invention as the ratio of filler-plate's thickness $d_F$ to that of the overall etalon gap $L'=(d_F+d_G)$, produces a wider field of view.

In a given interference order m, the etalon filter is known to transmit a spectral band centered around a wavelength $\lambda'$ that satisfies the condition $2L=m\lambda'$. Thus, the spectral tuning of the etalon as a function of temperature change $\Delta T$ is modeled as $$\Delta\lambda' = \lambda'\left(1 + \frac{\partial\lambda'}{\partial T}\Delta T\right) \quad (4)$$

where $\Delta\lambda'$ is the spectral shift of the peak wavelength of the etalon's characteristic in order m produced by the temperature change $\Delta T$. As a particular example, an etalon according to the invention of FIG. 3A was constructed to operate at a wavelength of $\lambda=656$ nm. The etalon plates 18,20 as well as the spacers S were made of fused silica with a thermal coefficient of expansion (CTE) approximately $7.1*10\text{-}6 \ 1/°$ C. The thickness of spacers was approximately 400 µm, while the thickness of the filler plate F (NEX-C glass sold by Ohara Corp. of Japan, with CTE~–0.2*10$^{-6}$ 1/° C. and dn/dT~18.2*10$^{-6}$) was about 350 µm. An air gap G of about 50 µm was left between the filler plate and the front etalon plate. Temperature tuning over a single free-spectral range of the etalon (FSR ~4 Angstrom) was accomplished over the range of about 35° C. at a rate of about 10.7 pm/° C. The effective cavity index of this etalon at 20° C. equaled approximately 1.4799, and its acceptance semi-angle (or half field-of-view) was about 48% wider than that of a corresponding air-spaced etalon with the same cavity length and materials.

In another example, the spacers were fabricated using NEX-C glass while the filler plate was made of fused silica (dn/dT~5.5*10$^{-6}$). The other parameters remained the same. Tuning across about 0.75 of the free-spectral range of the etalon was possible over approximately 60° C. of temperature range at a rate of about 5 pm/° C. In this case, the effective cavity index was about 1.4025 and the acceptance angle of the etalon filter was about 40% greater than that of the comparable air-spaced etalon.

Figure 4:
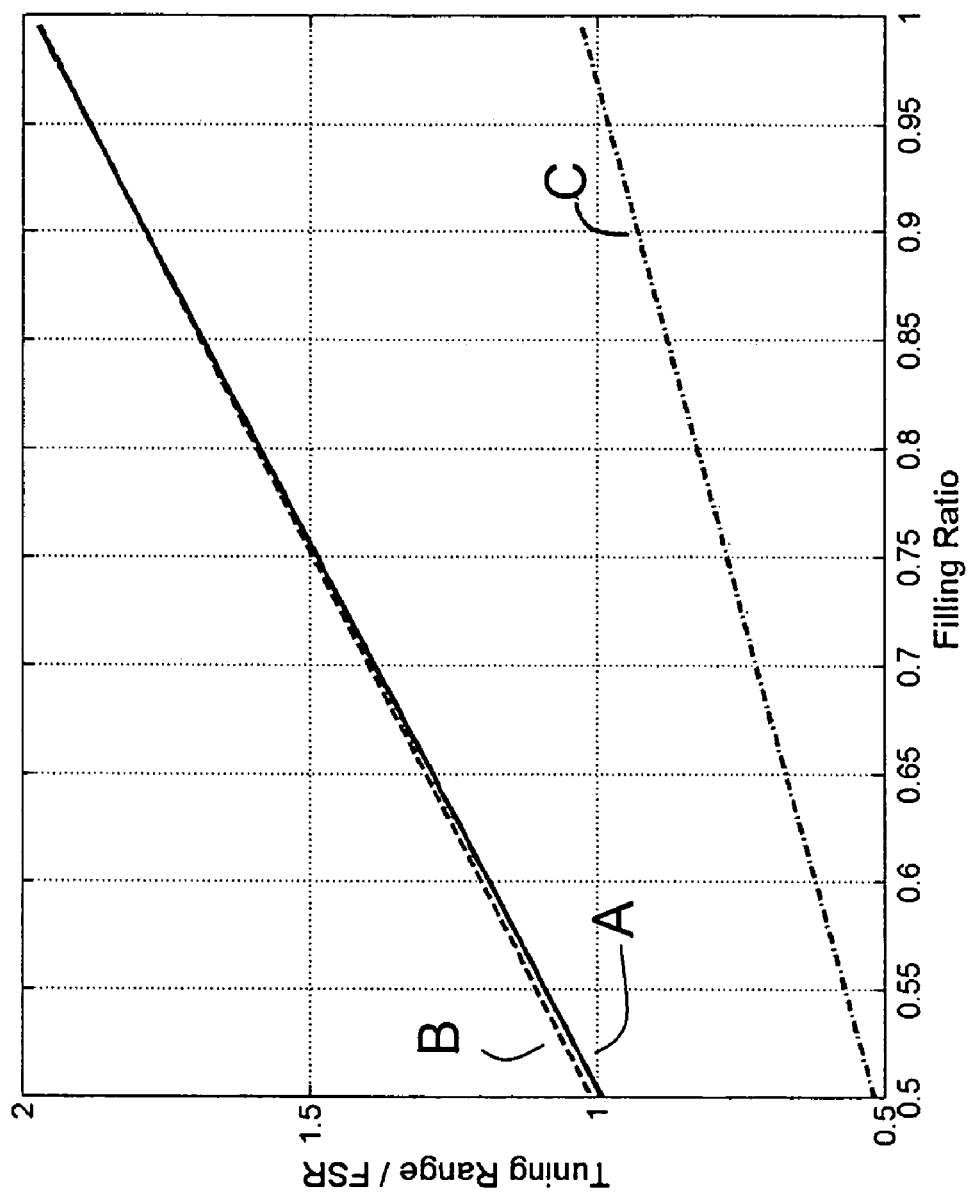
FIG. 4 shows three graphs of the tuning range, as a function of filling ratio and expressed in units normalized to FSR, for three different etalons according to the invention.
Figure 5:
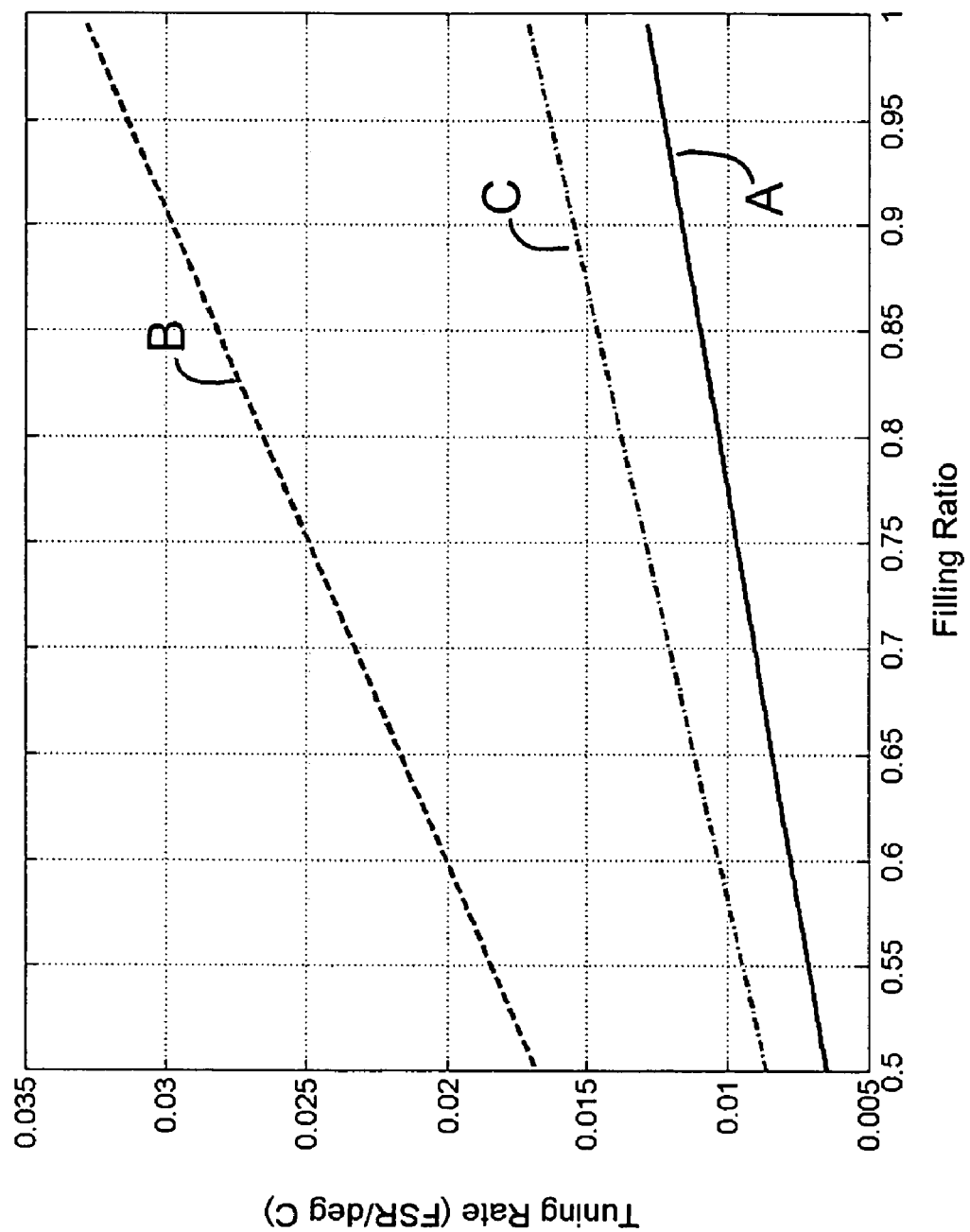
FIG. 5 shows three graphs of the thermal tuning rate, as a function of filling ratio and expressed in units normalized to FSR, for the same three different etalons of FIG. 4.

FIGS. 4 and 5 illustrate two temperature tuning characteristics (the range of thermal tuning and the thermal tuning rate, both expressed in terms of units normalized to the free spectral range of the respective etalons) for three different etalons (A, B, and C) as functions of the filling ratio. The etalons utilized NEX-C and CLEARCERAM-HS (both by Ohara Corporation) as optical materials. Table 1 below summarizes the specifications of each etalon.

TABLE 1

Parameters of composite solid-air-gap etalons used for FIGS. 4 and 5

| Filler Material | Spacer Material | Substrate Material | Cavity Length, um | Peak Wavelength, nm |
|---|---|---|---|---|
| A Fused Silica | CLEARCERAM-HS | Fused Silica | 400 | 656 |
| B NEX-C | Fused Silica | Fused Silica | 400 | 1550 |
| C Fused Silica | CLEARCERAM-HS | Fused Silica | 400 | 1310 |

The tuning ranges shown in FIG. 4 were obtained over a 60 deg C. temperature span. As those skilled in the art would readily understand, while the thermal tuning rate of a given etalon constructed according to the invention depends exclusively on its filling ratio, the overall tuning range for a given temperature span also depends on the physical length of the etalon cavity, a thicker etalon cavity providing a wider range of tuning. These properties are extremely useful because they make it possible to tune the etalon filters of the invention across a complete free spectral range within a temperature change that is practically manageable as an operating parameter. This is of a particular usefulness in many areas of technology, ranging from imaging and atmospheric observation to telecommunications. Fused silica, NEX-C and CLEARCERAM-HS in various combinations and thicknesses have shown to be good materials to achieve the thermal control that is at the heart of the invention.

Figure 6:
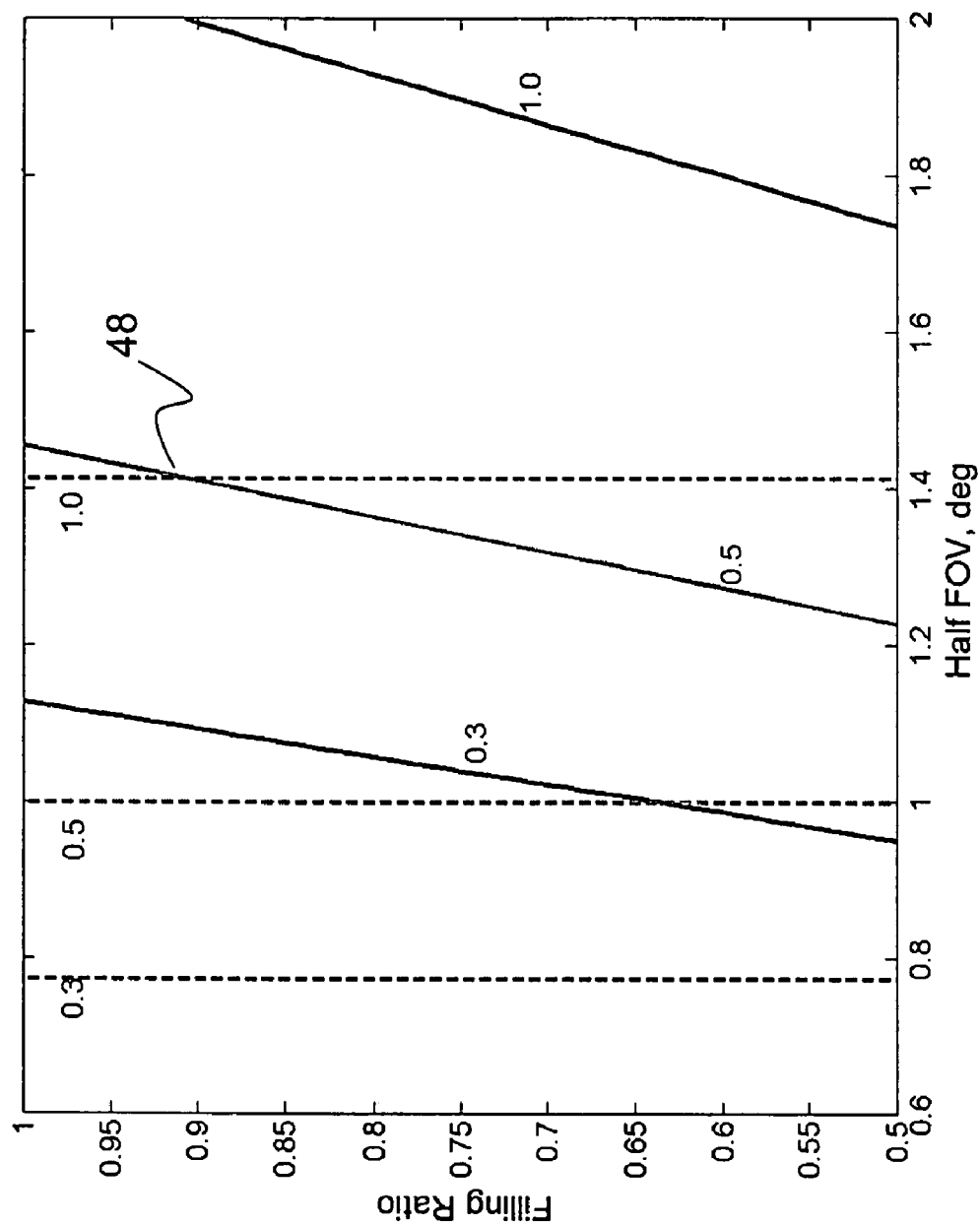
FIG. 6 is a contour plot illustrating the spectral shift of the transmission peak as a function of field of view and filling ratio for the etalon of the invention (solid lines) as compared to conventional air-spaced etalons (dashed lines).

FIG. 6 is a contour plot illustrating the spectral shift (measured in angstroms) of the transmission peak as a function of field of view and filling ratio for the etalon of the invention (solid lines) as compared to conventional air-spaced etalons (dashed lines). The solid line illustrate various spectral shifts of the peak wavelength (0.3, 0.5 and 1.0 angstroms) as a function of half FOV and filling ratio for etalon D constructed with the materials listed in Table 2 below. The dashed lines show the corresponding performance of conventional air-spaced etalons E made using materials also listed in Table 2. FIG. 6 also illustrates the increased field of view (FOV) of a tunable composite solid-air-spaced etalon according to invention (etalon D) as compared to a conventional air-spaced etalon (etalon E). As expected, the etalon of the invention exhibited progressively greater angles of acceptance with higher filling ratios, while the field of view remained constant for the conventional air-spaced etalon. For example, if the maximum allowable spectral shift is 0.5 angstroms, the half FOV of the composite etalon E with a filling ratio of about 0.9 satisfying this requirement is 1.42 (see point 48 in FIG. 6). This represents an increase of about 42% with respect to the air-spaced etalon E satisfying the same requirement (represented by the 0.5 dashed line).

TABLE 2

Parameters of composite and air-gap etalons used for FIG. 6

| Filler Material | Spacer Material | Substrate Material | Cavity Length, um | Peak Wavelength, nm |
|---|---|---|---|---|
| D Fused Silica | CLEARCERAM-HS | Fused Silica | 400 | 656 |
| E Air | CLEARCERAM-HS | Fused Silica | 400 | 656 |

Another embodiment 50 of the etalon of the invention is shown in FIGS. 7A and 7B in side and sectioned front views, respectively. Here, the filler plate F has a central opening 52 (which preferably also corresponds to respective openings 54 in the coatings 34 and 36) where an additional centrally located foot spacer S is positioned between the etalon plates 18,20 for enhanced performance. The optical performance of this embodiment is analogous to that described with respect to FIGS. 3A and 3B.

An alternative embodiment 60, shown in FIGS. 8A and 8B in side and sectioned front views, respectively, provides a structure analogous to that of FIGS. 3A/B wherein a ring-spacer S' is used instead of multiple spacers S distributed around the periphery of the etalon plates, as is well known in the art. The optical performance of this embodiment is analogous to that described with respect to the embodiments of FIGS. 3A and 3B as well.

Yet another embodiment 70, shown in FIGS. 9A and 9B, demonstrates a hybrid spacer structure composed of the ring-spacer S' positioned along the perimeter of the etalon and a foot spacer S placed in the central opening 52 of the filler plate F (which preferably also includes corresponding central openings 54 in the high-reflectance coatings 34 and 36. The optical performance of this etalon is again analogous to that described with respect to the other embodiments.

The invention has been shown and described with respect to certain preferred principles, embodiments and features. It is understood that these embodiments are representative of the subject matter broadly contemplated by the invention, and that the scope of the invention fully encompasses other embodiments which may become useful in the art. For example, the etalon gap may be filled with multiple layers of filler plates, or with matter other than air or vacuum, such as a liquid or another gas possessing required optical characteristics. Similarly, it is understood that in practice the optical surface (or surfaces) of the filler in contact with air would be coated with an antireflective coating.

Thus, while the invention has been shown and described in what are believed to be the most practical and preferred embodiments, it is recognized that departures can be made therefrom within the scope of the invention, which is therefore not to be limited to the details disclosed herein, but is to be accorded the full scope of the claims so as to embrace any and all equivalent apparatus and methods.

We claim:

1. An optical-cavity assembly comprising:
   two optical surfaces disposed in parallel to one another to define an optical cavity;
   a spacer structure establishing a physical length of the optical cavity between said two optical surfaces; and
   a transmissive filler plate disposed within the optical cavity and establishing an optical cavity length; and
   a central foot spacer axially disposed between said optical surfaces through an aperture in said transmissive filler plate;
   wherein the transmissive filler plate is made of a material selected to provide a predetermined rate of change of said optical cavity length as a function of temperature; and said spacer structure includes a plurality of spacers peripherally distributed between said optical surfaces.

2. The assembly of claim 1, wherein said predetermined rate of change of the optical cavity length as a function of temperature is selected to provide tunability of the optical cavity within a free spectral range of the optical cavity.

3. The assembly of claim 2, wherein each of said optical surfaces is a coated surface of an optical plate, and said spacer structure includes a plurality of spacers peripherally distributed between said optical surfaces.

4. The assembly of claim 1, wherein said predetermined rate of change of the optical cavity length as a function of temperature is selected to produce a negligible change in said optical cavity length within a range of operating temperatures.

5. The assembly of claim 1, wherein each of said optical surfaces is a surface of an optical plate.

6. The assembly of claim 1, wherein each of said optical surfaces is a coated surface of an optical plate.

7. The assembly of claim 1, wherein said transmissive filler plate is in optical contact with one of said two optical surfaces.

8. The assembly of claim 1, wherein said transmissive filler plate has a surface coated with an antireflective coating.

9. The assembly of claim 1, wherein said spacer structure is made of a spacer material selected from the group consisting of fused silica, clear CERAM-HS and NEX-C; and said transmissive filler plate is made of a filler material selected from the group consisting of fused silica, clear CERAM-HS and NEX-C.

10. An optical-cavity assembly comprising:
    two optical surfaces disposed in parallel to one another to define an optical cavity;
    a spacer structure establishing a physical length of the optical cavity between said two optical surfaces; and
    a transmissive filler plate disposed within the optical cavity and establishing an optical cavity length; and
    a central foot spacer axially disposed between said optical surfaces through an aperture in said transmissive filler plate;
    wherein the transmissive filler plate is made of a material selected to provide a predetermined rate of change of said optical cavity length as a function of temperature; and said spacer structure includes a tubular ring spacer between said optical surfaces.

11. The assembly of claim 10, wherein said predetermined rate of change of the optical cavity length as a function of temperature is selected to provide tunability of the optical cavity within a free spectral range of the optical cavity.

12. The assembly of claim 11, wherein each of said optical surfaces is a coated surface of an optical plate, and said spacer structure includes a plurality of spacers peripherally distributed between said optical surfaces.

13. The assembly of claim 10, wherein said predetermined rate of change of the optical cavity length as a function of temperature is selected to produce a negligible change in said optical cavity length within a range of operating temperatures.

14. The assembly of claim 10, wherein each of said optical surfaces is a surface of an optical plate.

15. The assembly of claim 10, wherein each of said optical surfaces is a coated surface of an optical plate.

16. The assembly of claim 10, wherein said transmissive filler plate is in optical contact with one of said two optical surfaces.

17. The assembly of claim 10, wherein said transmissive filler plate has a surface coated with an antireflective coating.

18. The assembly of claim 10, wherein said spacer structure is made of a spacer material selected from the group consisting of fused silica, clear CERAM-HS and NEX-C; and said transmissive filler plate is made of a filler material selected from the group consisting of fused silica, clear CERAM-HS and NEX-C.

* * * * *